(12) United States Patent
Neil

(10) Patent No.: US 9,341,827 B2
(45) Date of Patent: May 17, 2016

(54) ANAMORPHIC OBJECTIVE LENS

(71) Applicant: Cooke Optics Limited, Leicester (GB)

(72) Inventor: Iain A. Neil, Commugny (CH)

(73) Assignee: COOKE OPTICS LIMITED, Leicester (GB)

( * ) Notice: Subject to any disclaimer, the term of this patent is extended or adjusted under 35 U.S.C. 154(b) by 51 days.

(21) Appl. No.: 14/218,064

(22) Filed: Mar. 18, 2014

(65) Prior Publication Data

US 2014/0300973 A1    Oct. 9, 2014

Related U.S. Application Data

(60) Provisional application No. 61/808,343, filed on Apr. 4, 2013.

(51) Int. Cl.

| | | |
|---|---|---|
| *G02B 13/08* | (2006.01) | |
| *G02B 27/12* | (2006.01) | |
| *G02B 9/00* | (2006.01) | |
| *G02B 13/04* | (2006.01) | |
| *G02B 9/12* | (2006.01) | |
| *G02B 13/00* | (2006.01) | |
| *G02B 27/00* | (2006.01) | |
| *G02B 9/64* | (2006.01) | |
| *G02B 15/177* | (2006.01) | |

(52) U.S. Cl.
CPC . *G02B 13/08* (2013.01); *G02B 9/64* (2013.01); *G02B 13/0015* (2013.01); *G02B 13/0045* (2013.01); *G02B 13/04* (2013.01); *G02B 15/177* (2013.01); *G02B 27/0025* (2013.01)

(58) Field of Classification Search
CPC ............... G02B 13/0045; G02B 13/04; G02B 13/0015; G02B 9/64; G02B 15/177; G02B 27/0025; G02B 13/08

USPC ......... 359/664, 668, 670, 671, 738–740, 753, 359/784

See application file for complete search history.

(56) References Cited

U.S. PATENT DOCUMENTS

| | | | |
|---|---|---|---|
| 2,890,622 | A | 6/1959 | Wallin |
| 3,682,534 | A | 8/1972 | Cook et al. |

(Continued)

FOREIGN PATENT DOCUMENTS

| | | |
|---|---|---|
| EP | 1566681 A1 | 8/2005 |
| EP | 2535752 A1 | 6/2012 |
| WO | 2012123592 A1 | 3/2011 |

OTHER PUBLICATIONS

Burum, S.H., "American Cinematographer Manual", Book ,2004, pp. 144-177, ASC Press, Hollywood, California, U.S.A.

*Primary Examiner* — Evelyn A Lester

(74) *Attorney, Agent, or Firm* — Epstein Drangel LLP; Robert L. Epstein

(57) ABSTRACT

An anamorphic objective lens comprising, along an optical axis and in order from an object space to an image space: at least a negative (−) spherical first lens group; an anamorphic second lens group and a positive (+) spherical third lens group wherein an aperture stop is located before, after or preferably within the spherical third lens group. Both spherical lens groups contain spherical refractive optical surfaces and the anamorphic lens group contains cylindrical and plano optical surfaces with at least one cylindrical surface oriented at substantially 90 degrees about at least one other cylindrical surface. The negative spherical first lens group may provide focusing.

19 Claims, 16 Drawing Sheets

(56) References Cited

U.S. PATENT DOCUMENTS

| | | | |
|---|---|---|---|
| 4,017,160 A | 4/1977 | Betensky | |
| 7,085,066 B2 | 8/2006 | Neil | |
| 8,174,773 B2 | 5/2012 | Pretorius | |
| 2013/0010370 A1 | 1/2013 | Otani et al. | |
| 2013/0022345 A1* | 1/2013 | Dodoc et al. | 359/668 |

* cited by examiner

ANAMORPHIC OBJECTIVE LENS

CROSS-REFERENCE TO RELATED APPLICATIONS

The present application claims the benefit under 37 CFR §119(e) of U.S. Provisional Application No. 61/808,343 filed Apr. 4, 2013, the contents of which are incorporated herein their entirety.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to anamorphic objective lenses, and more particularly to a range of different focal length anamorphic objective lenses providing traditional anamorphic imaging characteristics and having relatively simple optical surface shapes and corresponding potential minimized cost by having an arrangement of three lens groups with spherical, anamorphic and spherical powers and an optical stop located outside of the first and second lens groups.

2. Description of Prior Art Including Information Disclosed Under 37 CFR 1.97 and 1.98

Contemporary anamorphic objective lenses normally have an optical axis and are commonly based on a front anamorphic lens group having predominantly X cylinder refractive optical surfaces and a rear spherical lens group with an optical stop in the rear spherical lens group or between the rear spherical lens group and the front anamorphic lens group that may be in the form of a variable aperture diameter iris or diaphragm.

This anamorphic objective lens arrangement produces images having numerous residual optical aberrations and characteristics most of which are desired by cinematographers because they produce an artistic look that is different from spherical objective lenses.

Many of the less desired residual optical aberrations and characteristics of this arrangement were accepted by cinematographers with film based cameras but with the advent and adoption of electronic sensor based digital cameras some of them have become less acceptable. In particular the amount of residual chromatic aberration has become less tolerable whereas some field curvature combined with some residual astigmatism is still acceptable.

Specific anamorphic objective lens characteristics of this arrangement such as the oval or elliptically shaped of out of focus objects commonly referred to as the bokeh as compared to the spherical shape produce by spherical objective lenses is preferred because of the distinctive artistic look produced. Another characteristic that is desired because of the distinctive artistic look produced is the depth of field being different in the vertical azimuth direction of the field versus the horizontal azimuth direction of the field. In the case of an anamorphic objective lens that squeezes the horizontal field of view by substantially two times as compared to the vertical field of view, the depth of field in the horizontal azimuth direction of the field is substantially two times greater than the depth of field in the vertical azimuth direction of the field.

Improving the optical aberrations and characteristics of anamorphic objective lenses of this arrangement may involve increasing optical surface shape complexity and hence manufacturing cost including adding aspherical and free-form shaped optical surfaces.

Thus, to address the artistic need of cinematographers and maximize the imaging potential of both film and digital cameras a cost effective anamorphic objective lens arrangement with a suitable blend of residual optical aberration correction and characteristics needs to be achieved.

BRIEF SUMMARY OF THE INVENTION

An anamorphic objective lens comprising along an optical axis and in order from an object space to an image space at least a negative (−) power spherical first lens group, an anamorphic second lens group, a positive (+) power spherical third lens group and having an optical stop located before or after or preferably within the spherical third lens group. The anamorphic second lens group has at least one cylindrical surface in a first direction and at least a second cylindrical surface in a substantially perpendicular direction to the first direction to enable a high degree of aberration correction over the whole image, whereby the residual longitudinal chromatic aberration and the residual lateral chromatic aberration are substantially reduced. The negatively powered spherical first spherical lens group may provide focusing by movement of at least one of the lens elements contained therein and may exhibit low breathing in the focus range.

The anamorphic second lens group provides a squeeze of the field of view so that the focal lengths in the X and Y directions are different by a ratio of about two times which is typical for traditional anamorphic optical systems. The positively powered third lens group adjacent the image space delivers the radiation passing through the optical system on to the image sensor with nearly telecentric light paths and suitably high relative illumination, thereby increasing the efficiency of many electronic sensors.

In accordance with one aspect of the present invention, an anamorphic objective lens is provided including, along an optical axis and in order from an object space to an image space, a negative (−) spherical power first lens group; an anamorphic second lens group, a positive (+) spherical power third lens group, and an aperture stop. The aperture stop is located in a position either before, after and within the spherical power third lens group.

Preferably, the aperture stop is located within said positive (+) spherical power third lens group.

The negative (−) spherical first lens group is configured to provide focusing.

In accordance with another aspect of the present invention, an anamorphic objective lens is provided including a first lens group with spherical powers of a first type, a second lens group with spherical powers of a second type, a third lens group with anamorphic powers, and an optical stop. The third lens group is interposed between the first lens group and the second lens group. The optical stop is located outside the first lens group and the third lens group.

The spherical powers of the first type are opposite to the spherical powers of the second type. The spherical powers of one of the first type and the second type are negative spherical power. The spherical powers of the other of the first type and the second type are positive spherical powers.

The anamorphic objective lens has an optical axis. The first, second and third lens groups are situated along said optical axis. The anamorphic objective lens is adapted for use between an object space and an image space. The optical axis extends between the object space and the image space.

The anamorphic second lens group has at least one cylindrical surface in a first direction and at least one cylindrical surface in a direction substantially perpendicular to said first direction.

The anamorphic second lens group has focal lengths in the X and Y directions which differ and together with the other lens group focal lengths altogether produce focal lengths in X and Y directions which differ by a ratio of about two times.

The anamorphic objective lens preferably has a focal length within the range of from 25 mm to 135 mm in the Y direction.

The anamorphic objective lens provides low residual chromatic aberration, a traditional oval bokeh shape, and different depths of field in the vertical and horizontal azimuth directions of the field.

The anamorphic objective lens has a medium fast full aperture moderately wide angle field of view of the fixed focal length (prime) type.

The lens groups of the anamorphic objective lens are fabricated of lens elements made of glass.

The lens groups with spherical powers include a lens element with a rotationally symmetrical surface shape about the optical axis.

The lens group with anamorphic powers includes a lens element with a non-rotationally symmetrical surface about the optical axis.

The anamorphic objective lens preferably operates at an aperture of f/2.4 and over a waveband of 455-656 nm.

The anamorphic second lens group comprises five cylindrically surfaced lens elements with four Y cylinders, three X cylinders and three plano surface shapes.

The spherical first lens group includes two lens elements, one of which is axially moveable relative to the other.

The spherical third lens group includes seven lens elements.

BRIEF DESCRIPTION OF THE SEVERAL VIEWS OF DRAWINGS

To these and to such other objects that may hereinafter appear, the present invention relates to an anamorphic lens as described in detail in the following specification and recited in the annexed claims, taken together with the accompanying drawings, in which like numerals refer to like parts and in which:

Figure 1:
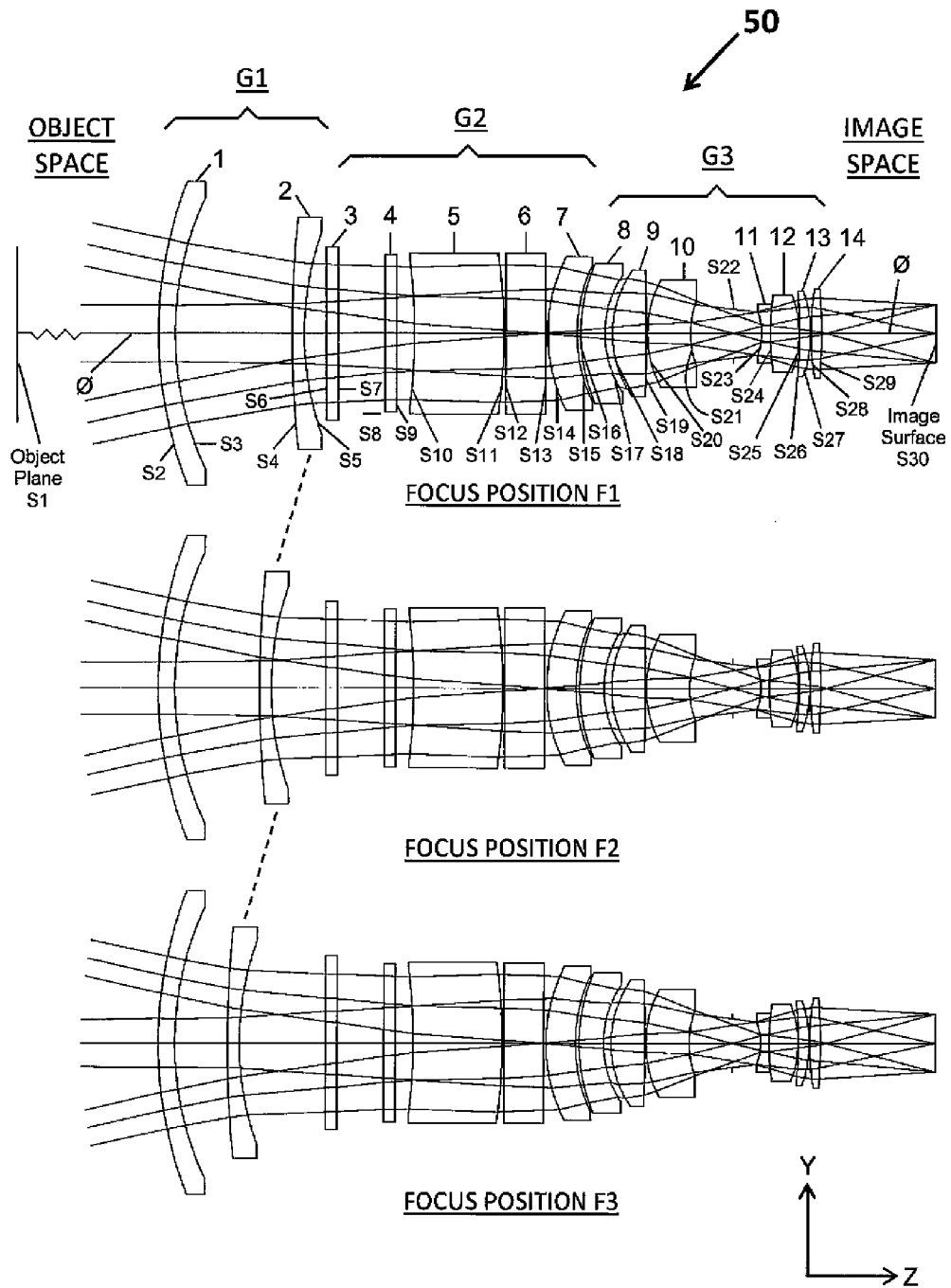
FIG. 1 is a lens plot in the YZ elevation (side view) on an optical axis Ø where the Y direction focal length is 42.47 mm with three fields shown at zero, top and bottom of the field of view and the top to bottom diagrams showing far, intermediate and close focus distance arrangements.
Figure 2:
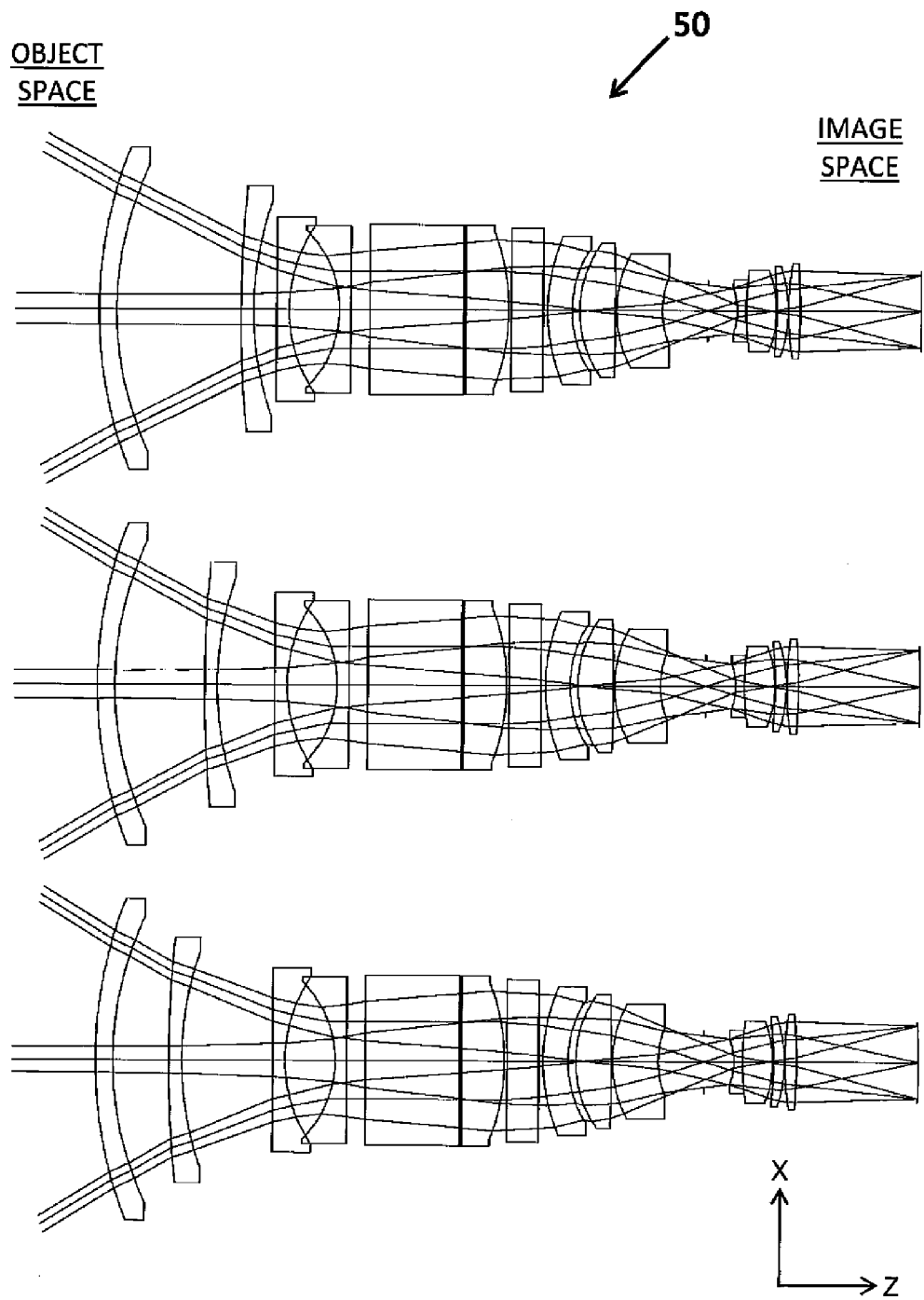
FIG. 2 is a lens plot in the XZ elevation (plan view) on an optical axis Ø where the X direction focal length is 21.47 mm with three fields shown at zero, top and bottom of the field of view and the top to bottom diagrams showing far, intermediate and close focus distance arrangements.
Figure 3:
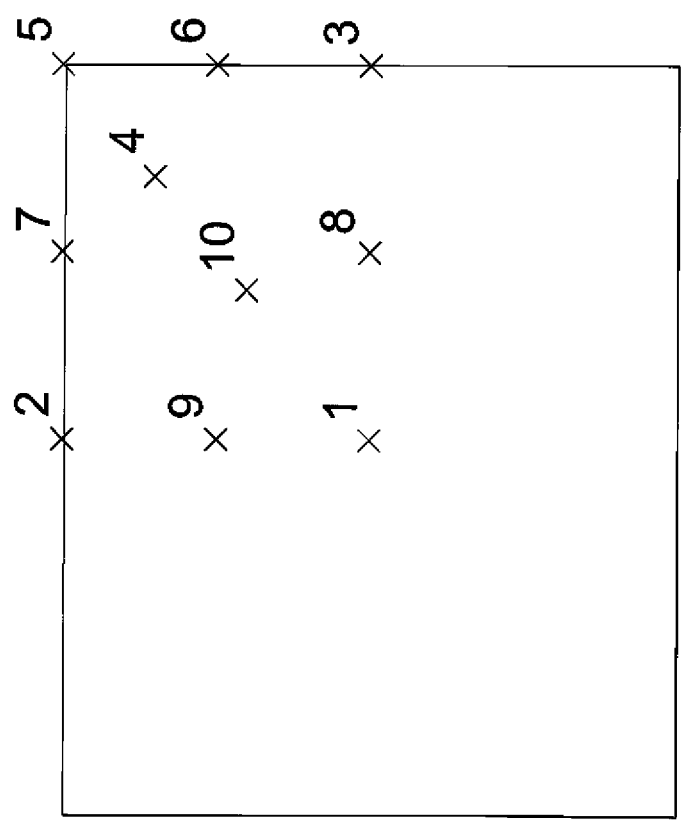
FIG. 3 is an image plot for the image points used in the transverse ray aberration and MTF plots in FIGS. 4-15.

The information shown in FIGS. 1-16 was generated by CodeV® optical design software, which is commercially available from Synopsis Optical Research Associates, Inc., Pasadena, Calif., USA.

DETAILED DESCRIPTION OF THE INVENTION

The invention relates to anamorphic objective lenses, and in particular to a range of different focal length anamorphic objective lenses covering at least a focal length range from 25 mm to 135 mm and providing low residual chromatic aberration, a traditional oval bokeh shape and different depths of field in the vertical and horizontal azimuth directions of the field.

The term "lens group" as used in connection with the anamorphic objective lens disclosed herein means one or more individual lens elements. Also, the terms "optical stop" and "stop" are equivalent terms that can be used interchangeably. A "field stop" as the term is used herein is a stop where the chief rays do not go through the center of the stop at the optical axis and the general purpose of a field stop is to vignette the edges of the radiation beams.

In the example provided herein, the front lens group is negatively powered and the rear lens group is positively powered and they have been paired with an anamorphic lens group to work in unison and match the preferred optical interface characteristics of sensors, where near telecentric radiation beams approach the sensor.

The example embodiment discussed below is a medium fast full aperture moderately wide angle field of view anamorphic objective lens of the fixed focal length (prime) type.

In the example embodiment, all of the lens elements are made from glasses. The lens element optical surface shapes in the spherical first lens group and the spherical third lens groups are all rotationally symmetrical about the optical axis such as spherical and in the anamorphic second lens group at least one lens element surface shape is non-rotationally symmetrical about the optical axis such as cylindrical.

The aforementioned optical example, although providing these kinds of features and others like low breathing and telecentric radiation output at the sensor, are capable of achieving suitable levels of various performance including image quality resolution and contrast, high relative illumination for low shading and efficient optical throughput at the sensor via near telecentric radiation output at the sensor, which telecentric radiation output is less than about 10 degrees.

The novel configuration of having a negatively powered spherical first lens group, an anamorphic second lens group followed by a positively powered spherical third lens group containing an optical stop may produce some residual distortion, astigmatism and field curvature aberrations but those aberrations to a tolerable extent contribute to the anamorphic look as desired by many cinematographers. In addition, a balanced blend of the afore-described lens characteristics may aid in cost reduction of manufacture. With the advent and adoption of digital cameras employing electronic sensors a large back focal length which was once required for film cameras having a reflex mirror may be less necessary but is still provided for in the novel anamorphic objective lens.

The example embodiment disclosed operates at an aperture of f/2.4 and over a waveband of 455-656 nm and this waveband is what was used in the Transverse Ray Aberration (TRA) Figures (see bottom right of TRA Figures) and in the MTF Figures (see top right of MTF Figures). A faster or slower aperture may be required and an extended waveband may be required. The aperture may be increased or reduced and the waveband expanded and the optical designs re-optimized to maximize image quality over such apertures and wavebands without departing from the invention. Also, during such re-optimization alternate glass types may be used without departing from the spirit and scope of the disclosure. Furthermore, more complex optical surface shapes such as aspherical and free-form surfaces may be introduced for expanded performance but at the likely effect of increased manufacturing cost.

FIGS. 1-16 relate to an example embodiment in which the focal length in the Y and X directions are 42.47 mm and 21.47 mm, the overall length is 245 mm from the first refractive surface vertex of the lens to the image vertex, the front diameter clear aperture is 89.61 mm, the back focal length from the rear refractive surface vertex to the image vertex is 36.07 mm and the close focus distance from the object to the image is 985.00 mm. The focal lengths of the spherical first lens group, anamorphic second lens group and spherical third lens group are 130.62 mm, −132.23 mm and 133.86 mm for the far, intermediate and close focus distances, 1032.81 mm in the Y direction and −140.60 mm in the X direction and 66.75 mm.

The focal lengths of the five lens elements of the anamorphic second lens group containing at least one cylindrical surface are in order from an object space to an image space −81.27 mm (in X direction), −64.50 mm (in X direction), 1379.50 mm (in Y direction), 90.87 mm (in X direction) and 6151.28 mm (in Y direction. It is to be understood that the focal lengths of the five lens elements of the anamorphic second lens group in the other X and Y directions are substantially large and hence have little optical power. The nominal image size is 8.91 mm vertical half height and 10.65 mm horizontal half width.

The lens system comprises a total of fourteen lens elements with twelve singlets and one doublet. The spherical first group contains two lens elements with one element axially movable for focusing at different distances, the anamorphic second lens group contains five cylindrically surfaced lens elements with four Y cylinders, three X cylinders and 3 plano surface shapes and the spherical third lens group contains seven lens elements. The optical stop lies within the spherical third lens group. In this example embodiment the telecentric radiation output is about 7.8 degrees at all three focus positions.

Optical prescription Table 1 is set forth below in the Appendix and describes a select example of the embodiment of the anamorphic objective lens disclosed herein.

Table 2 contains focal length, anamorphic squeeze and illumination data. In Table 2 it is shown that the relative illumination is above 40%, which is sufficiently high for low shading across the field of view when an anamorphic objective lens is used in combination with an electronic sensor at the image plane, such as when the anamorphic objective lens constitutes part of a digital camera.

Figure 4:
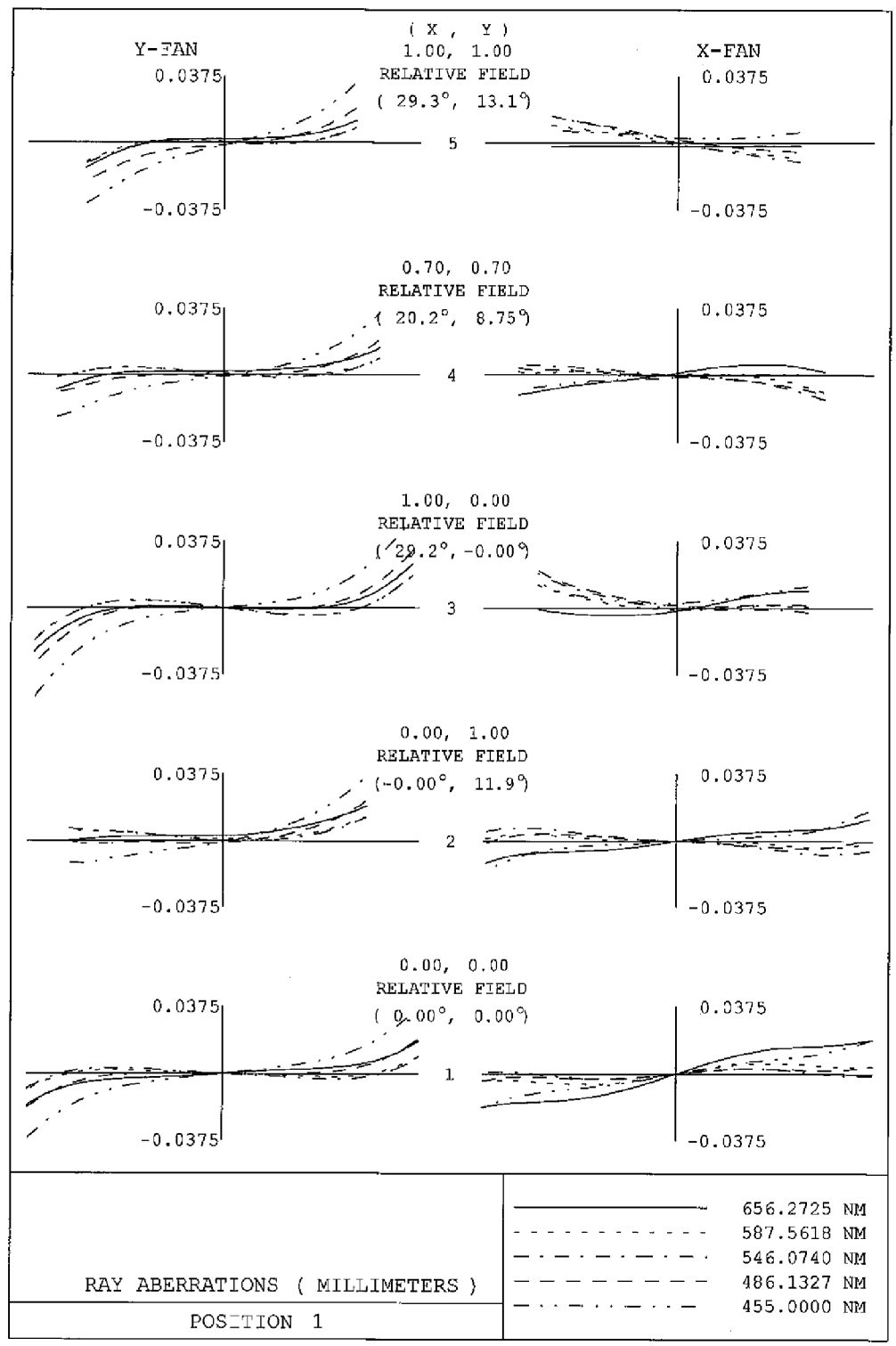
FIG. 4-9 are transverse ray aberration plots at far, intermediate and close focus distances with five fields shown in each Figure and 10 fields spread across the image for each focus distance.
Figure 5:
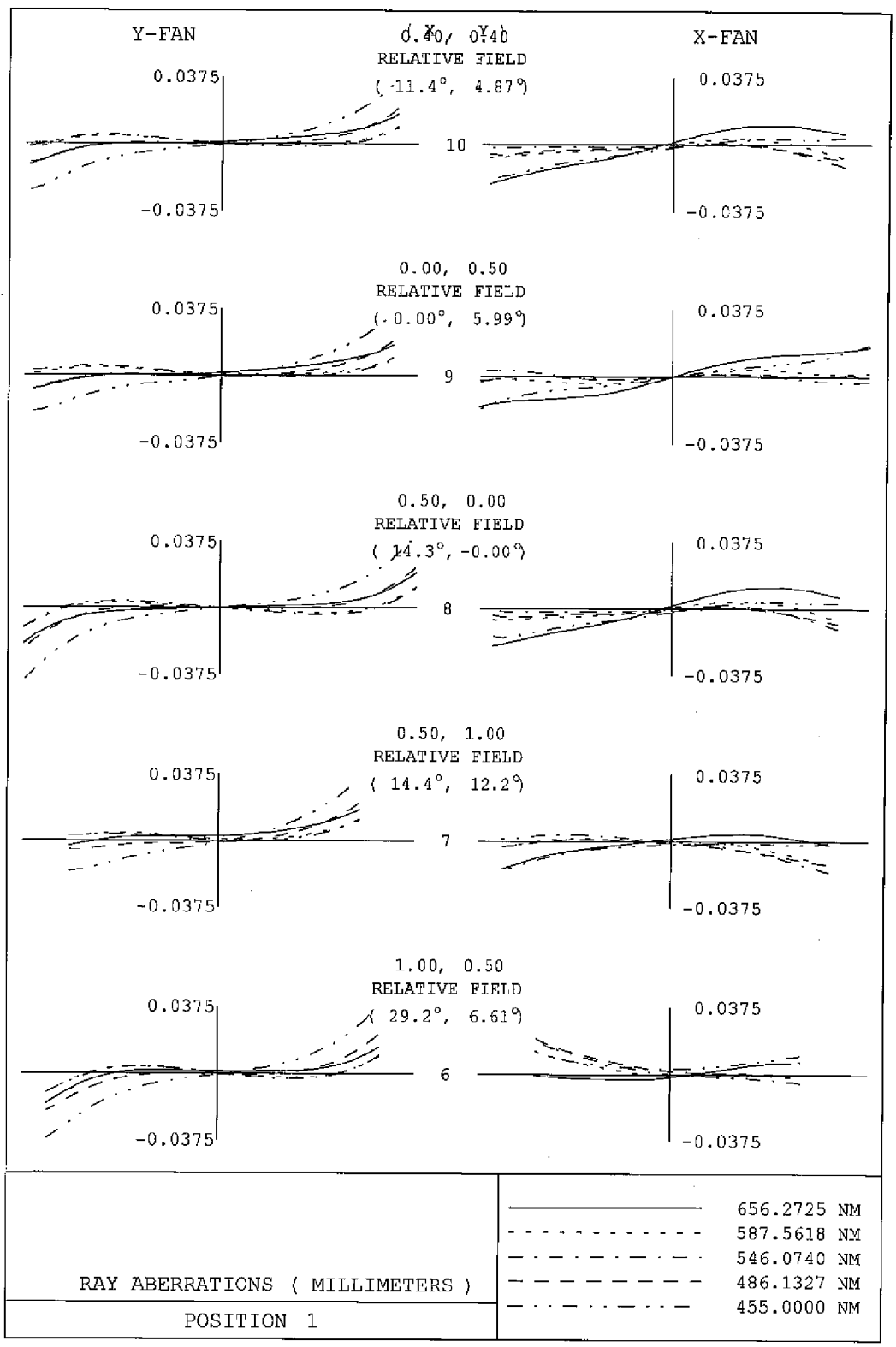
Figure 6:
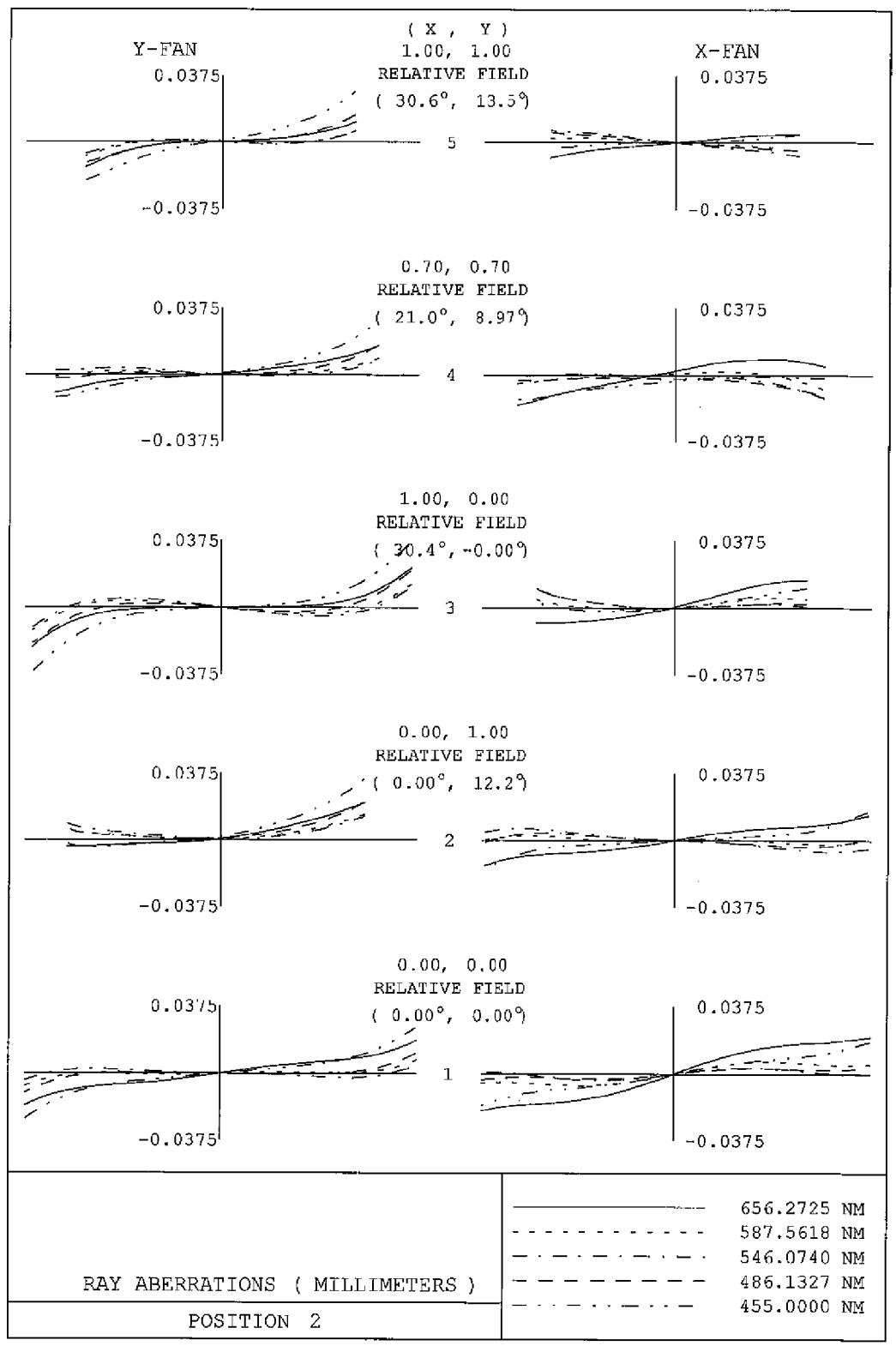
Figure 7:
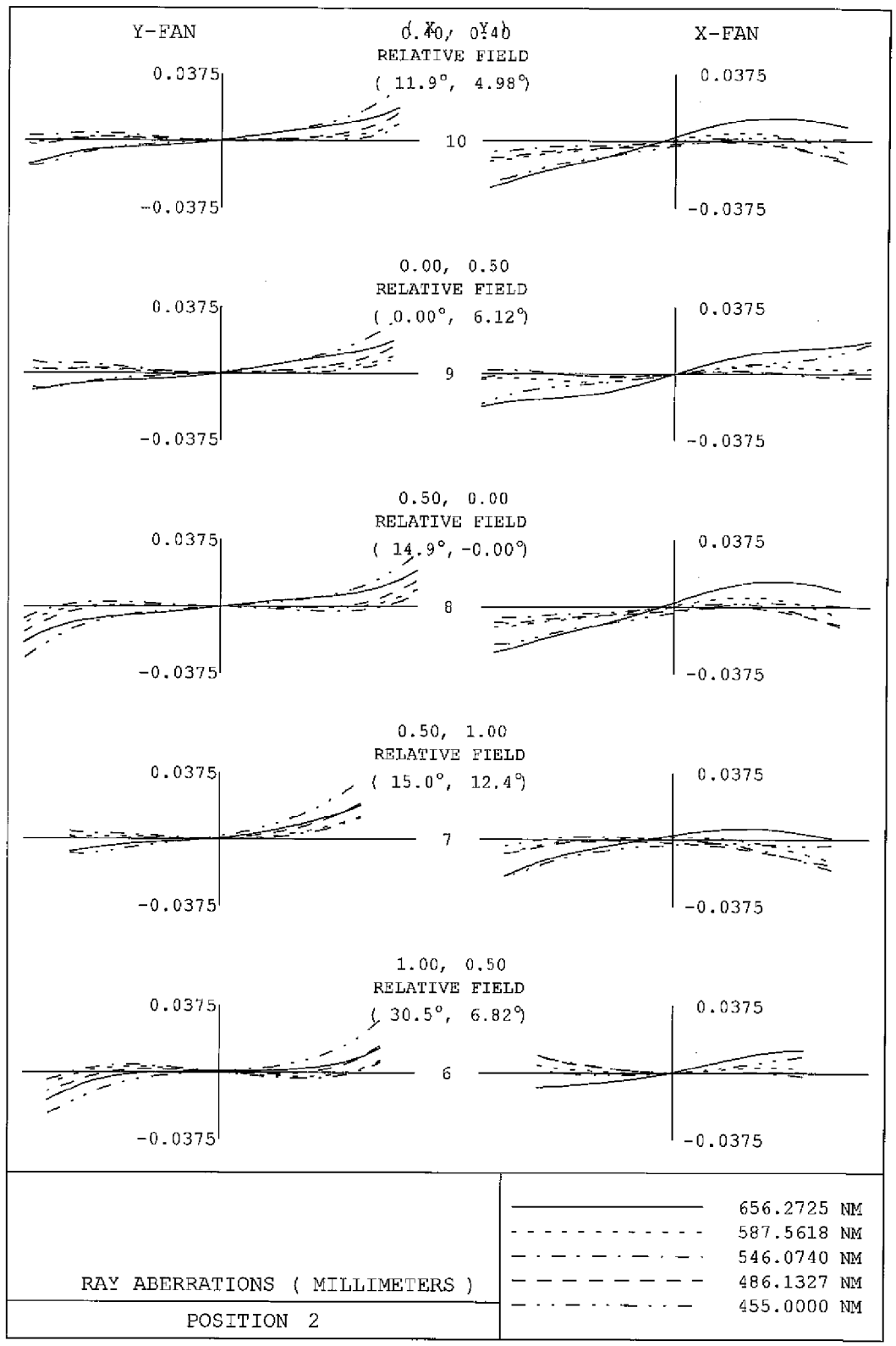
Figure 8:
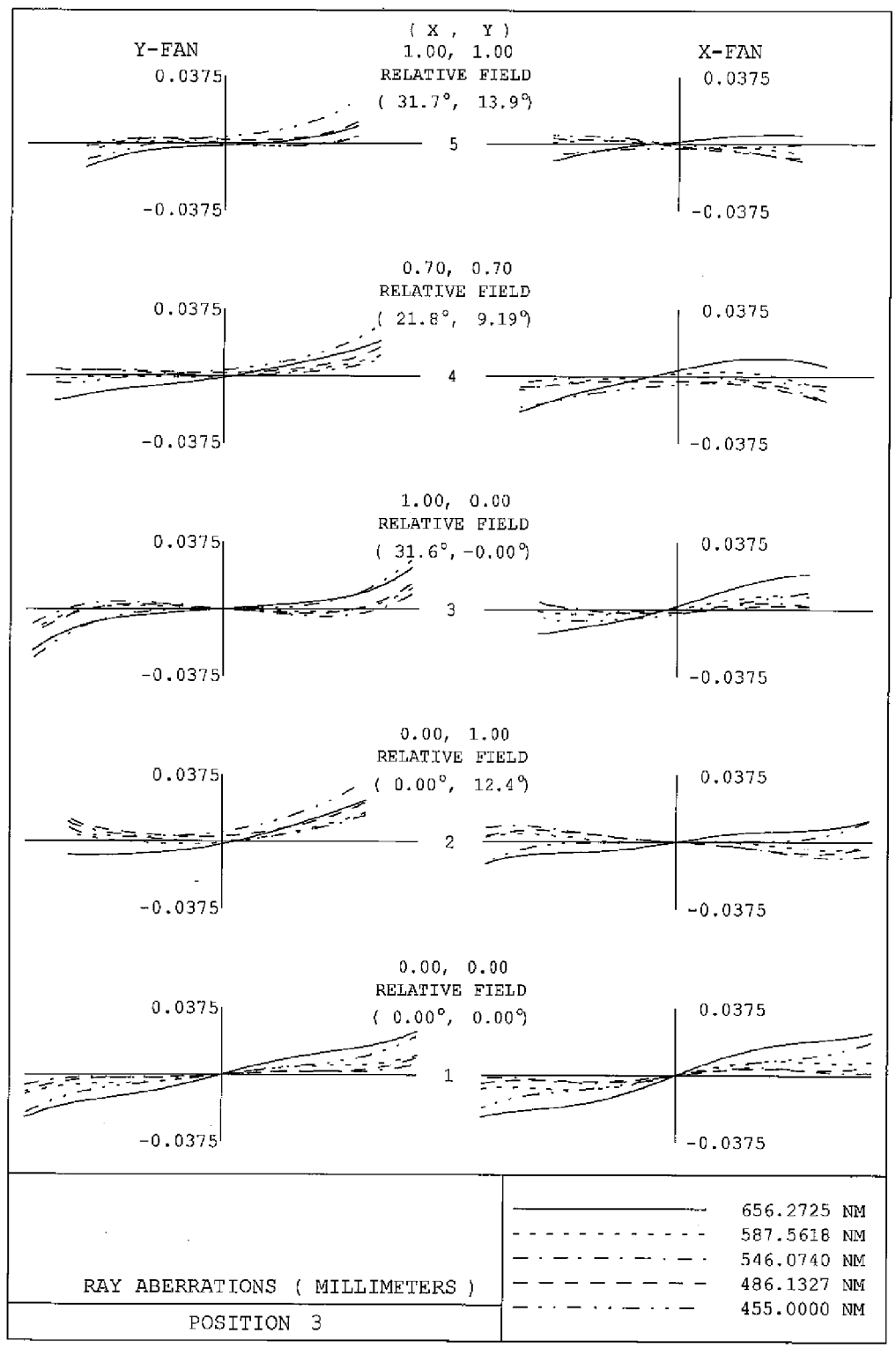
Figure 9:
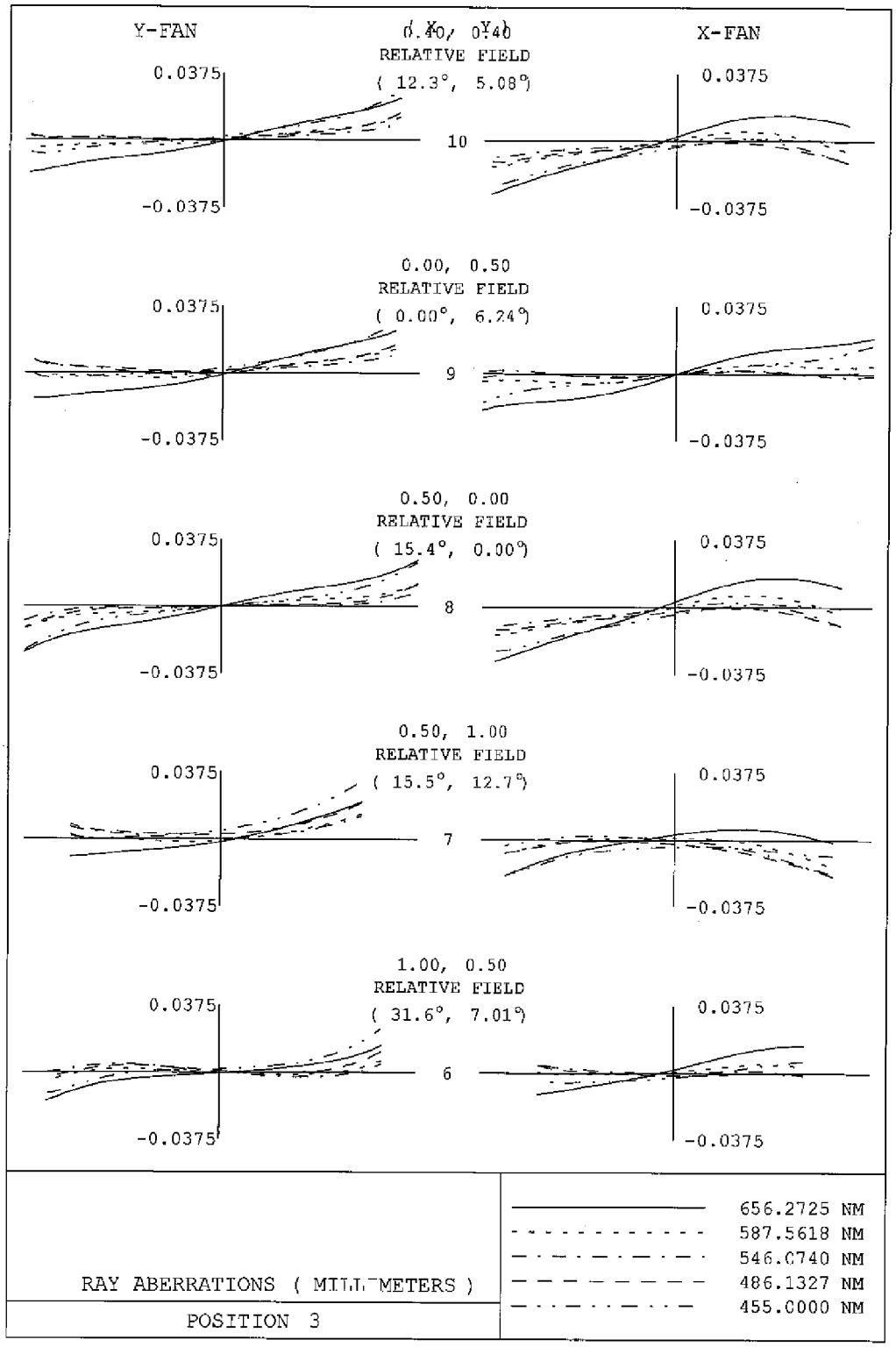

In FIGS. 4-9, the transverse ray aberration performance for the example embodiment is shown with minimized residual astigmatic and longitudinal and lateral chromatic aberrations on curved image surfaces to approximately emulate curved object surfaces. FIGS. 4 and 5 show transverse ray aberration plots at a far focus distance, 6 and 7 show transverse ray aberration plots at an intermediate focus distance and FIGS. 8 and 9 show transverse ray aberration plots at a close focus distance.

Figure 10:
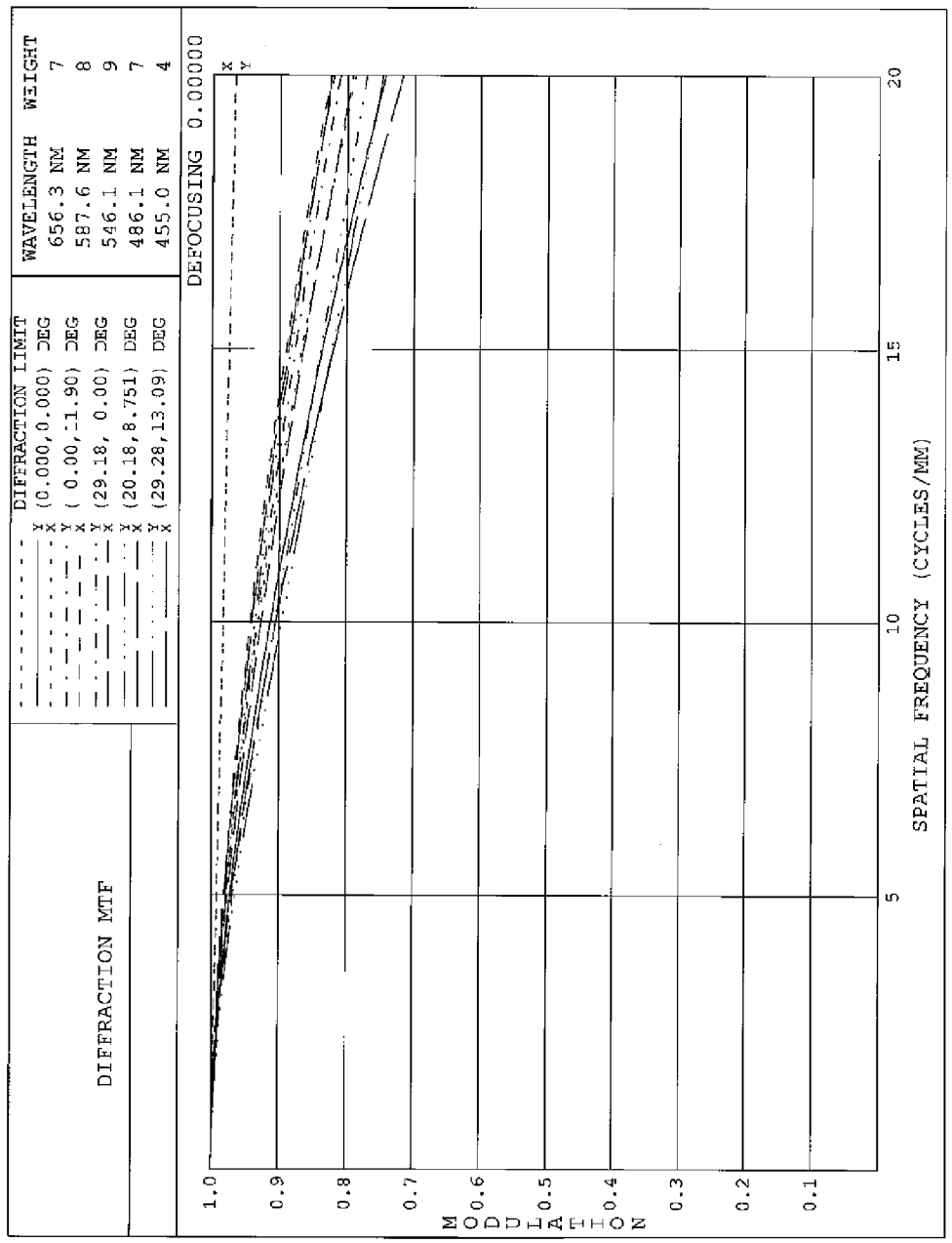
FIG. 10-15 are MTF plots at far, intermediate and close focus distances with five fields shown in each Figure and 10 fields spread across the image for each focus distance.
Figure 11:
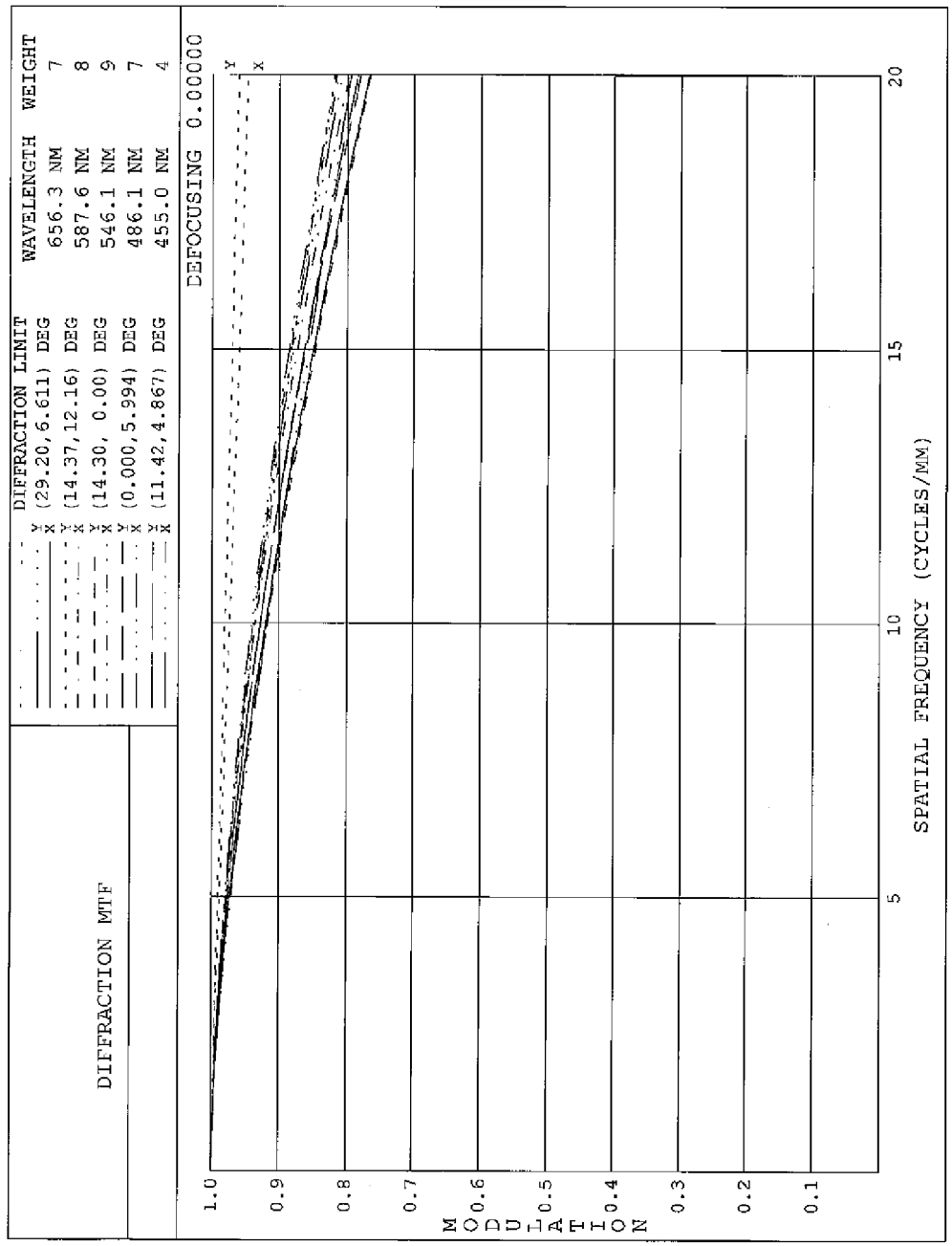
Figure 12:
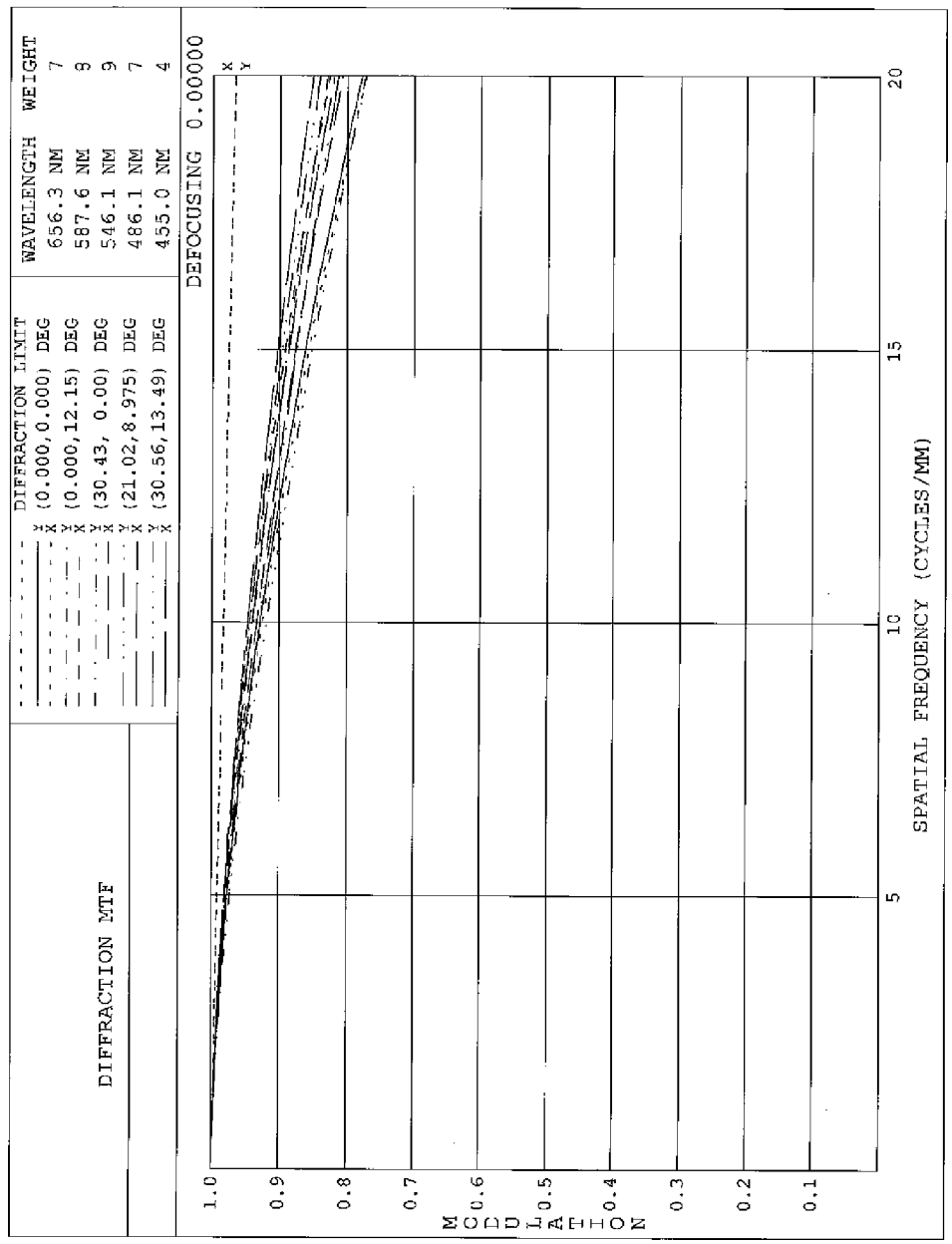
Figure 13:
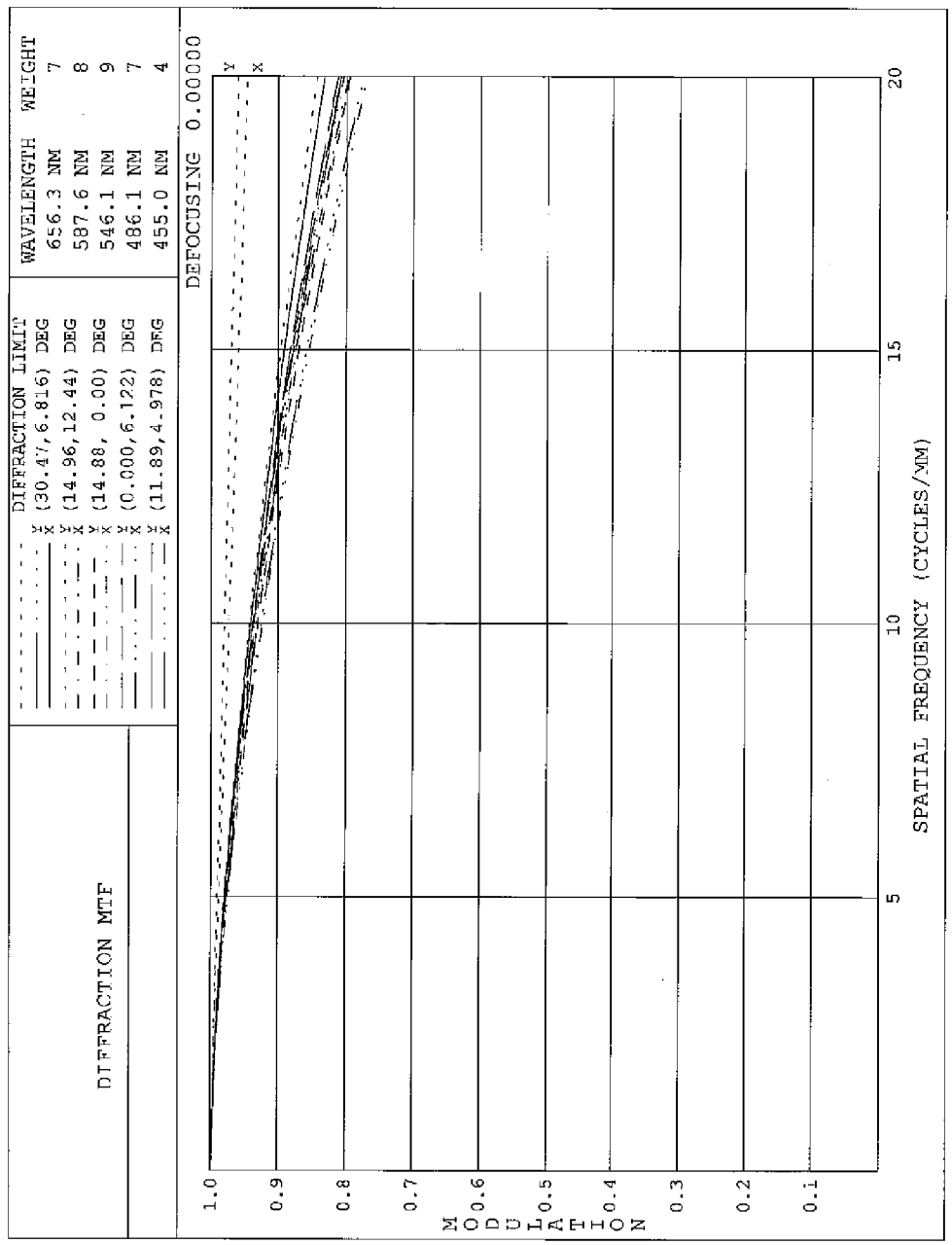
Figure 14:
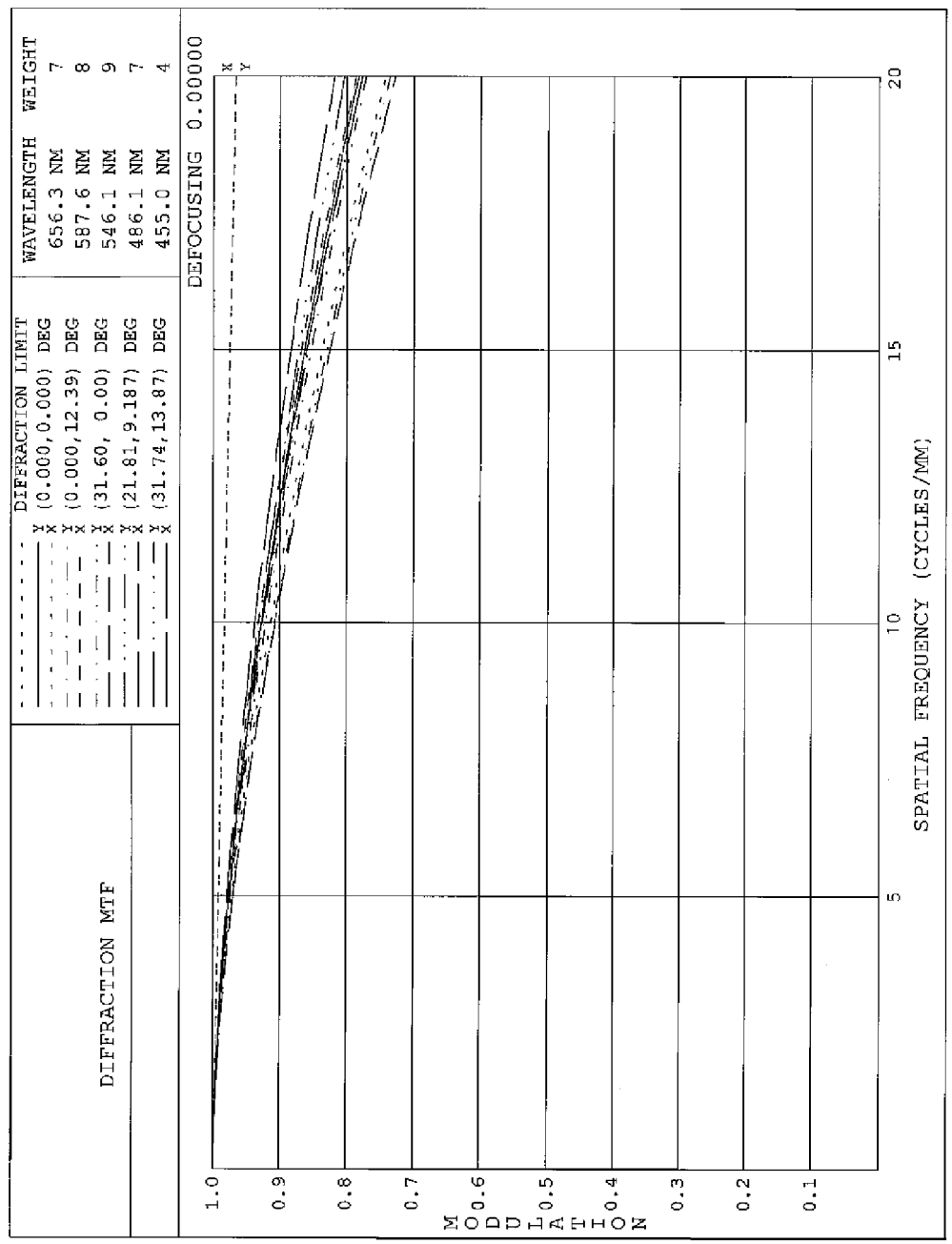
Figure 15:
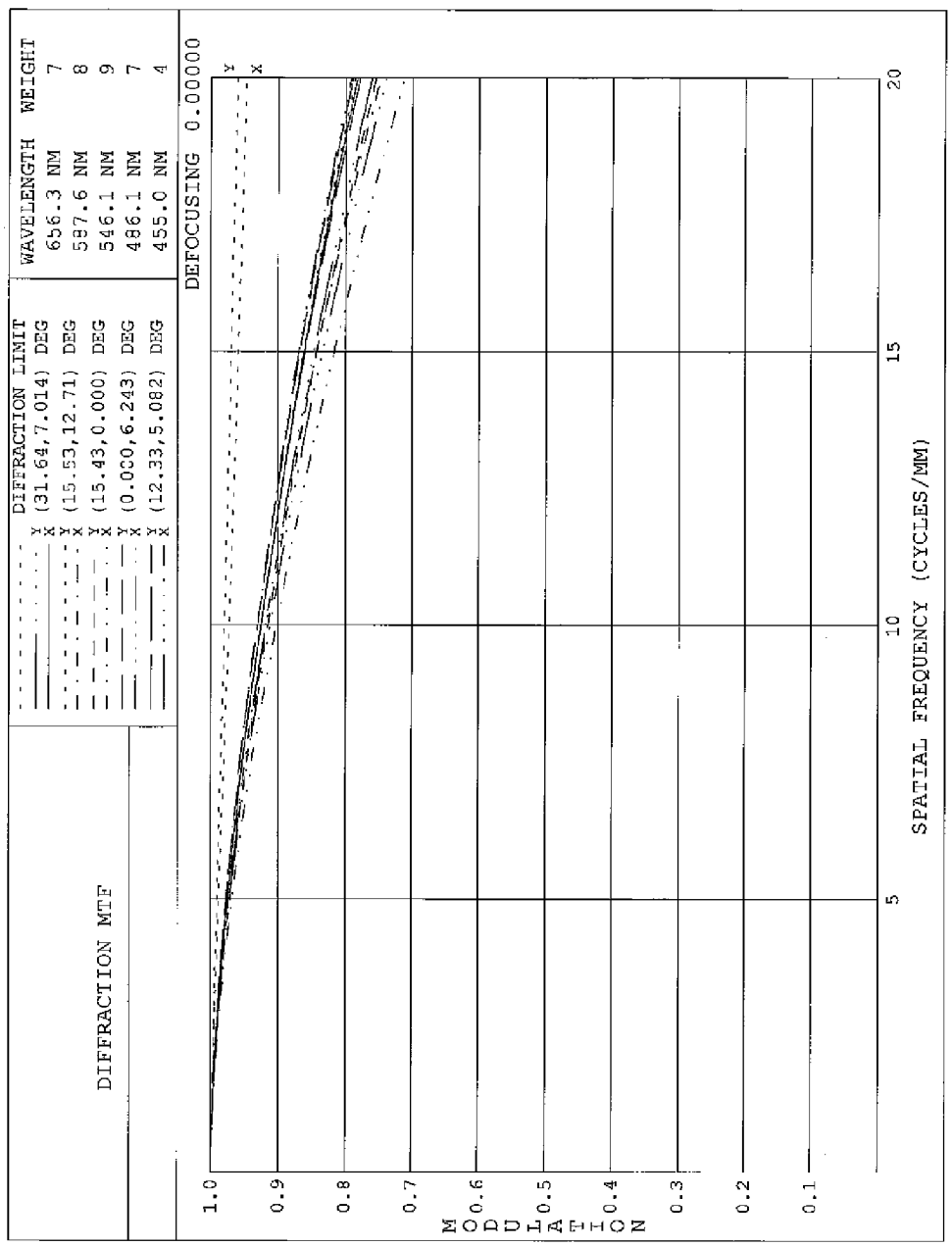

In FIGS. 10-15, the polychromatic MTF performance at a spatial frequency of 20 cycles/mm is shown for the example embodiment to be greater than 70% at all field positions at the far and close focus distances and greater than 75% for all axial field positions at an intermediate focus distance. FIGS. 10 and 11 show MTF at a far focus distance, FIGS. 12 and 13 show MTF at an intermediate focus distance and FIGS. 14 and 15 show MTF at a close focus distance.

Figure 16:
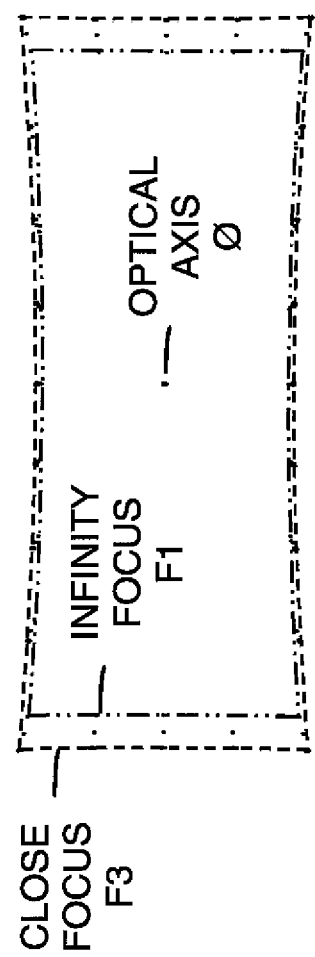
FIG. 16 is a field plot of the field of view covered at far, intermediate and close focus distances.

In FIG. 16, the periphery of the field of view at far, intermediate and close focus distances is shown on a plane in object space located at substantially 3.66 m from the image surface. The variation in the field of view size is mainly dependent on variations through focus in the anamorphic squeeze ratio, distortion in X and Y directions and focus breathing caused by change in the X and Y focal lengths.

Field stops may be employed in additional locations to those given in Table 1 for the example embodiment. They may be located anywhere within the lens system. Their purpose is to vignette the radiation and may be circular or rectangular or even rectangular with radius corners.

The five lens elements in the anamorphic second lens group with the cylindrical surfaces of the example embodiment additionally may each have two refractive surfaces which may be formed by X and Y cylindrical surfaces or Y and X cylindrical surfaces with the X and Y surfaces substantially perpendicular to one another. This arrangement may improve the imaging characteristics but likely at the effect of additional manufacturing cost.

Although the present invention has been fully described in connection with an embodiment thereof with reference to the accompanying drawings and data listing, it is to be noted that various changes and modifications including smaller and larger focal lengths, smaller and larger anamorphic squeeze ratios, smaller and larger full aperture f/numbers, smaller and larger image sizes, smaller and larger wavebands, etc. (e.g., 435 nm to 656 nm) may be made as will be apparent to those skilled in the art. Such changes and modifications are to be understood as being included within the scope of the present invention as defined by the appended claims.

What is claimed is:

1. An anamorphic objective lens comprising along an optical axis and in order from an object space to an image space: a negative (−) spherical power first lens group; an anamorphic second lens group comprising at least one lens element having a non-rotationally symmetric surface shape about the optical axis; a positive (+) spherical power third lens group, and an aperture stop; wherein all lens elements having a non-rotationally symmetric surface shape about the optical axis are located between the object space and the aperture stop such that the anamorphic objective lens creates a traditional oval or elliptical bokeh of out of focus objects.

2. The anamorphic objective lens of claim 1 wherein said aperture stop is located before, after or within said positive (+) spherical power third lens group.

3. The anamorphic objective lens of claim 1, wherein said negative (−) power spherical first lens group is configured to provide focusing.

4. The anamorphic objective lens of claim 1 wherein said anamorphic second lens group has at least one cylindrical surface in a first direction and at least one cylindrical surface in a direction substantially perpendicular to said first direction.

5. An anamorphic objective lens comprising along an optical axis and in order from an object space to an image space: a negative (−) spherical power first lens group; an anamorphic second lens group; a positive (+) spherical power third lens group, and an aperture stop; wherein only said anamorphic second lens group includes a lens element having a non-rotationally symmetric surface shape such that the anamorphic objective lens creates a traditional oval or elliptical bokeh of out of focus objects.

6. The anamorphic objective lens of claim 5 wherein said anamorphic second lens group comprises at least one lens element having a cylindrical surface in a first direction and at least one lens element having a cylindrical surface is a direction substantially perpendicular to said first direction.

7. The anamorphic objective lens of claim 1 or 5 wherein said anamorphic second lens group has focal lengths in the X and Y directions which differ by a ratio of about two times.

8. The anamorphic objective lens of claim 1 or 5 having a focal length within the range of from 25 mm to 135 mm.

9. The anamorphic objective lens of claim 1 or 5, wherein the anamorphic objective lens creates low residual chromatic aberration.

10. The anamorphic objective lens of claim 1 or 5 wherein the anamorphic objective lens creates different depths of field in the vertical and horizontal azimuth directions of the field.

11. The anamorphic objective lens of claim 1 or 5 wherein said lens creates a medium fast full aperture moderately wide angle field.

12. The anamorphic objective lens of claim 1 or 5 wherein said lens groups are fabricated of lens elements made of glass.

13. The anamorphic objective lens of claim 1 or 5 which operates at an aperture of f/2.4 and over a waveband of 455-656 nm.

14. The anamorphic objective lens of claim 1 or 5 wherein said anamorphic second lens group comprises five cylindrically surfaced lens elements with four Y cylinders, three X cylinders and three plano surface shapes.

15. The anamorphic objective lens of claim 1 or 5 wherein said spherical power first lens group comprises two lens elements, one of which is axially moveable relative to the other.

16. The anamorphic objective lens of claim 1 or 5 wherein said spherical power third lens group comprises seven lens elements.

17. The anamorphic objective lens of claim 1 or 5 wherein at least one vignetting field stop aperture is located before said optical stop.

18. The anamorphic objective lens of claim 1 or 5 wherein at least one vignetting field stop aperture is located after said optical stop.

19. The anamorphic objective lens of claim 1 or 5 wherein at least one vignetting field stop aperture is located before and after said optical stop.

* * * * *

UNITED STATES PATENT AND TRADEMARK OFFICE
CERTIFICATE OF CORRECTION

PATENT NO. : 9,341,827 B2
APPLICATION NO. : 14/218064
DATED : May 17, 2016
INVENTOR(S) : Iain A. Neil It is certified that error appears in the above-identified patent and that said Letters Patent is hereby corrected as shown below:

Column 6, line 40, prior to the claim preamble, Tables on the attached pages should be inserted Signed and Sealed this
Twenty-eighth Day of June, 2016

Michelle K. Lee
*Director of the United States Patent and Trademark Office*

TABLE 1

Optical Prescription

| Item | Group | Surface No. | Surface Shape[1] | Focus Position | Separation (mm) | Y Radius of Curvature (mm) | X Radius of Curvature (mm) | Material Type | Material Code | Material Name[2] | Material Supplier[3] | Aperture[4,5] Half Diameter (mm) |
|---|---|---|---|---|---|---|---|---|---|---|---|---|
| Object Plane | | S1 | Plano | F1 | 999999.000 | Flat | Flat | Air | | | | |
| | | | | F2 | 1588.000 | | | | | | | |
| | | | | F3 | 740.000 | | | | | | | |
| 1 | G1 | S2 | Sph. | All | 5.200 | 126.302 | 126.302 | Glass | 713539 | S-LAL8 | OHARA | 44.81 |
| | | S3 | Sph. | F1 | 36.814 | 97.245 | 97.245 | Air | | | | 41.68 |
| | | | | F2 | 26.599 | | | | | | | |
| | | | | F3 | 16.553 | | | | | | | |
| 2 | G1 | S4 | Sph. | All | 3.800 | 353.064 | 353.064 | Glass | 734515 | S-LAL59 | OHARA | 33.93 |
| | | S5 | Sph. | F1 | 6.883 | 92.759 | 92.759 | Air | | | | 31.40 |
| | | | | F2 | 17.097 | | | | | | | |
| | | | | F3 | 27.144 | | | | | | | |
| 3 | G2 | S6 | Plano | All | 3.500 | Flat | Flat | Glass | 516641 | S-BSL7 | OHARA | 25.26 |
| | | S7 | X Cyl. | All | 14.839 | Flat | 42.117 | Air | | | | 24.37 |
| 4 | G2 | S8 | X Cyl. | All | 3.450 | Flat | -32.150 | Glass | 497816 | S-FPL51 | OHARA | 22.90 |
| | | S9 | Plano | All | 5.746 | Flat | Flat | Air | | | | 22.76 |
| 5 | G2 | S10 | Y Cyl. | All | 27.940 | -173.155 | Flat | Glass | 847238 | SF57 | SCHOTT | 22.59 |
| | | S11 | Y Cyl. | All | 0.630 | -162.219 | Flat | Air | | | | 23.30 |
| 6 | G2 | S12 | Plano | All | 12.510 | Flat | Flat | Glass | 678553 | S-LAL12 | OHARA | 23.21 |
| | | S13 | X Cyl. | All | 0.653 | Flat | -61.868 | Air | | | | 22.89 |
| 7 | G2 | S14 | Y Cyl. | All | 9.576 | 50.915 | Flat | Glass | 883408 | S-LAH58 | OHARA | 22.28 |
| | | S15 | Y Cyl. | All | 1.260 | 46.847 | Flat | Air | | | | 20.82 |
| 8 | G3 | S16 | Sph. | All | 7.688 | 53.607 | 53.607 | Glass | 847238 | SF57 | SCHOTT | 20.27 |
| | | S17 | Sph. | All | 2.459 | 31.937 | 31.937 | Air | | | | 17.95 |
| 9 | G3 | S18 | Sph. | All | 10.712 | 33.809 | 33.809 | Glass | 713539 | S-LAL8 | OHARA | 18.17 |
| | | S19 | Sph. | All | 0.250 | -417.944 | -417.944 | Air | | | | 17.14 |
| 10 | G3 | S20 | Sph. | All | 13.716 | 34.017 | 34.017 | Glass | 805255 | ZF7LHT | CDGM | 15.42 |
| | | S21 | Sph. | All | 13.684 | 26.110 | 26.110 | Air | | | | 10.05 |
| Stop | | S22 | Plano | All | 8.868 | Flat | Flat | Air | | | | 7.51 |
| 11 | G3 | S23 | Sph. | All | 2.640 | -18.475 | -18.475 | Glass | 805255 | ZF7LHT | CDGM | 6.73 |
| 12 | G3 | S24 | Sph. | All | 8.997 | 82.967 | 82.967 | Glass | 649530 | S-BSM71 | OHARA | 8.20 |
| | | S25 | Sph. | All | 0.140 | -31.527 | -31.527 | Air | | | | 10.85 |
| 13 | G3 | S26 | Sph. | All | 3.432 | -121.596 | -121.596 | Glass | 835427 | HZLAF55A | CDGM | 11.49 |
| | | S27 | Sph. | All | 0.100 | -38.403 | -38.403 | Air | | | | 12.03 |
| 14 | G3 | S28 | Sph. | All | 3.447 | 84.972 | 84.972 | Glass | 835427 | HZLAF55A | CDGM | 12.67 |
| | | S29 | Sph. | All | 36.067 | -179.044 | -179.044 | Air | | | | 13.20 |
| Image Surface | | S30 | X & Y Cyl. | F1 | | -969.559 | -1399.906 | Air | | | | |
| | | | X & Y Cyl. | F2 | | -932.314 | -317.163 | | | | | |
| | | | X & Y Cyl. | F3 | | -2149.64 | -213.21 | | | | | |

Notes:-

1. In the Surface Shape column the image surface is not flat to simulate equivalent curved object surfaces through focus distance positions F1, F2 and F3.
2. In the Material Name column the trade name of the lens material used is given.
3. In the Material Supplier column a manufacturer name is given although there may be alternative manufacturers.
4. The data given in the Aperture Half Diameter column is for circular apertures.
5. The data given in the Aperture Half Diameter column for surface numbers 21, 23 and 29 are vignetting field stop apertures.

TABLE 2

Focal Length, Anamorphic Squeeze and Illumination

| Focus Position | Paraxial Effective Focal Length | | Anamorphic Squeeeze Ratio[1] | Relative Illumination[2] (%) |
| --- | --- | --- | --- | --- |
| | Y Direction (mm) | X Direction (mm) | | |
| F1 | 42.47 | 21.47 | 1.978 | 45.1 |
| F2 | 41.13 | 20.59 | 1.998 | 45.2 |
| F3 | 39.94 | 19.81 | 2.016 | 45.2 |

Notes:-
1. Based on paraxial focal length in Y direction divided by paraxial focal length in X direction.
2. At maximum radial image distance from the optical axis which is at the corner of the image.